(12) United States Patent
Boire-Lavigne et al.

(10) Patent No.: US 7,924,454 B2
(45) Date of Patent: *Apr. 12, 2011

(54) FAX TRANSMISSION OVER THE PACKET NETWORK

(75) Inventors: Sébastien Boire-Lavigne, Verdun (CA); Richard Collette, Laval (CA); Guy Blanchette, Londonderry, NH (US); Mike Diperno, Beconsfield (CA)

(73) Assignee: Sagemcom Canada Inc., Montreal (CA)

( * ) Notice: Subject to any disclaimer, the term of this patent is extended or adjusted under 35 U.S.C. 154(b) by 556 days.

This patent is subject to a terminal disclaimer.

(21) Appl. No.: 11/840,765

(22) Filed: Aug. 17, 2007

(65) Prior Publication Data

US 2007/0279699 A1 Dec. 6, 2007

Related U.S. Application Data

(63) Continuation of application No. 10/350,168, filed on Jan. 23, 2003, now Pat. No. 7,283,270.

(51) Int. Cl.
*H04N 1/04* (2006.01)

(52) U.S. Cl. ........ 358/1.15; 358/442; 358/425; 358/468
(58) Field of Classification Search ................. 358/1.15, 358/442, 425, 468
See application file for complete search history.

(56) References Cited

U.S. PATENT DOCUMENTS 6,483,600 B1 * 11/2002 Schuster et al. ............. 358/1.15

* cited by examiner

*Primary Examiner* — Houshang Safaipour
(74) *Attorney, Agent, or Firm* — Ditthavong Mori & Steiner, P.C.

(57) ABSTRACT

A FoIP server mediating fax communication between gateways and enterprise backend systems. The gateways are VoIP capable, connected to the PSTN and the enterprise network, and mediate between the PSTN fax call and fax over IP calls. The FoIP Server mediates between the FoIP calls and enterprise backend systems, such as message transfer agent (MTA), Customer Relationship Management CRM, document management, web services, mainframe, or a specialized application requiring faxing capabilities.

23 Claims, 13 Drawing Sheets

FAX TRANSMISSION OVER THE PACKET NETWORK

RELATED APPLICATION

This application is a continuation of U.S. patent application Ser. No. 10/350,168 filed Jan. 23, 2003, entitled FAX TRANSMISSION OVER THE PACKET NETWORK.

FIELD OF THE INVENTION

The present Invention relates to facsimile (fax) transmission, and more particularly, to the transmission of faxes over the packet network.

BACKGROUND OF THE INVENTION

Over the last 20 years, facsimile (fax) has been a successful means to transmit documents electronically. With the emergence of Internet and e-mail, it appeared as though that fax would be rapidly replaced by the e-mail. However, it is now clear that the two technologies will co-exist for a while.

FIG. 1 shows present-day deployment of fax machines in an office environment equipped with Internet messaging. A fax server 2 is connected to the public switched telephone network (PSTN) 4 by a plurality of dedicated lines, such as T1/E1. The PSTN 4 is the "outside world" as far as the fax server 2 is concerned and is the source of incoming faxes as well as the sink of outgoing faxes. The fax server 2 is also connected to a packet network 6 which provide connections to a plurality of users (e.g. 16). In this way, the fax server 2 enables corporations to provide desktop faxing capabilities to employees via e-mail architectures such as Exchange, Notes, SMTP, and other backend applications. The fax server 2 can also used to provide fax-back transaction confirmation, fax broadcasting or automated form processing.

The fax server 2 requires specialized interface cards 14 for providing the conversion between fax information sent by the users. When the document arrives at the fax server 2, the fax server 2 converts the document into a format that is suitable for transmission over the PSTN 4. Finally, the fax server 2 sends the converted document over the PSTN 4 via its dedicated interface cards 14. Conversely, for a fax arriving at the fax server 2, the fax server 2 identifies the destination user, converts the incoming fax transmission into a format suitable for delivery to the destination user, and sends the converted document to the destination user over the internal IP network.

In a common enterprise of today, the users are not only connected to the fax server 2 via the internal IP network 6, but are also connected to an to internetworking gateway 8, which connects the internal IP network 6 to a global Internet 12. The gateway 8 allows a user 16 to communicate electronically with other parties (e.g. 18) connected to the global Internet 12. Such electronic communications may include store-and-forward messages (e.g., e-mail), real-time one-way communications (e.g., live TV), real-time two-way communications (e.g., Internet telephony, etc.).

The gateway 8 is typically connected to an Internet Service Provider 10 (ISP), which is basically a larger gateway or the PSTN. The connection between the gateway 8 and the ISP 10 or the PSTN is typically established via dedicated T1/E1 lines, similarly to the connection between the fax server 2 and the PSTN 4.

It is apparent that a first set of dedicated T1/E1 lines are required to provide fax functionality and a second set of dedicated T1/E1 lines are required to provide Internet access functionality. The use of two sets of dedicated telephone/Data lines is expensive to maintain and, moreover, it is possible to experience the situation in which either set of lines is idle while the other set is being used at its maximum capacity. In such a situation, the capacity of the underused set of lines goes to waste. The requirement for dedicated hardware for interfacing with the PSTN translates into a further non-negligible expense for the enterprise.

It is therefore desirable to provide a new system that can harmoniously integrate a fax based communication tool with other communication tools though IP network.

SUMMARY OF THE INVENTION

It is an object of the invention to provide a novel method and system that obviates or mitigates at least one of the disadvantages of existing systems.

The present invention uses a server which mediates between a gateway connected to the PSTN using a packet based communication protocol for receiving/sending fax message through the gateway and enterprise service infrastructure.

In accordance with an aspect of the present invention, there is provided a communication system for delivering fax messages, which includes: one or more message transfer agents (MTAs), each for which transferring and receiving messages; a packet network; a gateway connecting Public Switched telephone network (PSTN) and the packet network; and a server for establishing communication with the gateway through the packet network and transacting fax message between the MTA and a fax terminal connected to the PSTN.

In accordance with a further aspect of the present invention, there is provided a method of processing a fax message in a communication network. The communication network including one or more message transfer agents (MTAs), a packet network, one or more gateways connecting Public Switched telephone network (PSTN) and the packet network, and one or more servers for transacting fax message between the MTA and a fax terminal connected to the PSTN. The method includes the steps of: selecting a server that handles a fax call on the terminal when the fax is reached at the terminal; establishing a session between the gateway and the selected server and a session between the fax terminal sending the fax on the PSTN and the server; transferring the fax from the fax terminal to the selected server; storing information related to the fax in a media database; terminating the sessions; determining, in the server, a destination address of an MTA for the incoming fax on the server; connecting the server to the MTA to transfer the incoming fax message; creating, in the server, a message in a format compatible with the selected MTA based on the stored information; and transferring the created message to the MTA.

In accordance with a further aspect of the present invention, there is provided a method of processing a fax message in a communication network. The method includes the steps of: receiving a message from the MTA in the server (a file document is attached to the message); retrieving information of the message; storing the information into a database; verifying if the sender sending the fax is authorized to send faxes and verifying if the recipient who receives the fax is valid; completing a sender information; converting the file document from an original format to a predetermined format; establishing a session between the server and the gateway; transferring the fax content written by the predetermined format from the server to the gateway.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
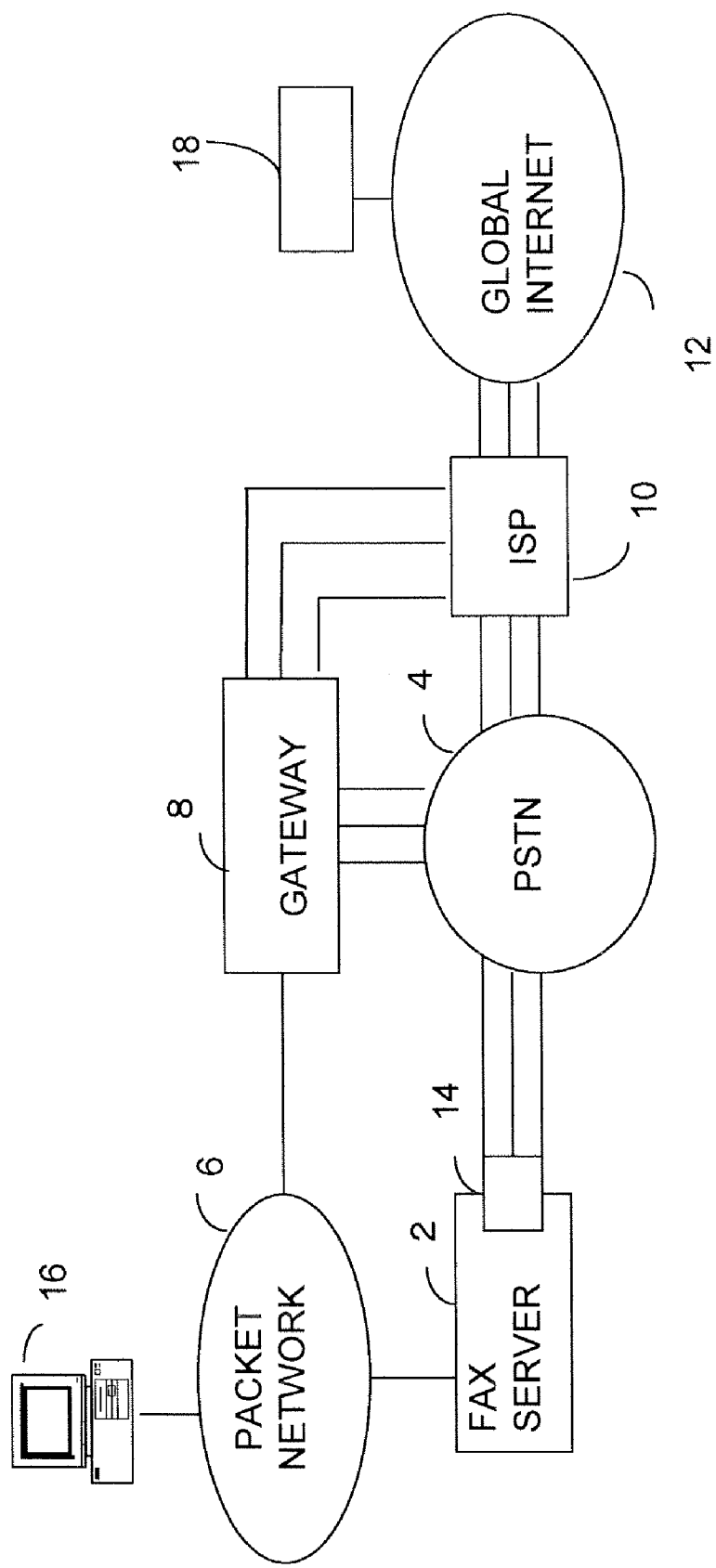
FIG. 1 is a schematic diagram showing conventional deployment of fax machines.
Figure 2:
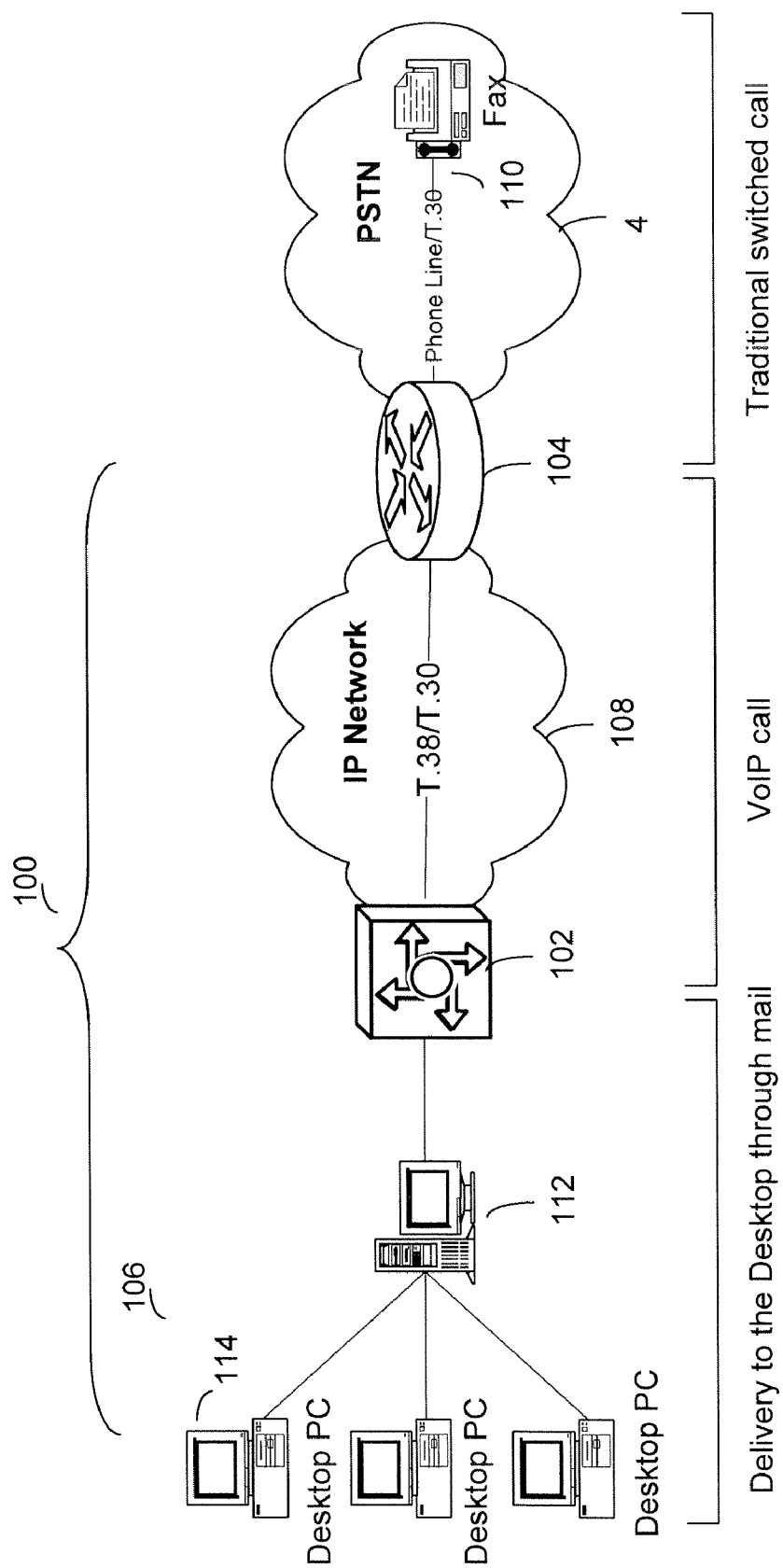
FIG. 2 is schematic diagram showing a communication network in accordance with an embodiment of the present invention.

FIG. 2 shows a communication network 100 in accordance with an embodiment of the present invention. The communication network 100 includes a FoIP (Real Time Fax Over IP) server 102, a gateway 104 and a messaging system 106.

The FoIP server 102 communicates with the gateway 104 through the IP network 108. The gateway 104 communicates with a fax machine 110 on the PSTN 4. The FoIP server 102 may mediate fax communication between the gateway(s) 104 and an enterprise backend system(s) (e.g. messaging system 106).

The gateway 104 acts as an entrance between networks. The gateway mediates fax call from the PSTN 4 and fax over IP calls. For example, the computers that control traffic within a company's network or at an Internet service provider (ISP) are gateway nodes. The gateway may be associated with both a router for directing a given packet of data that arrives at the gateway 104, and a switch for providing an actual path in and out of the gateway 104 for a given packet.

In the description below, the gateway 104 is a VoIP gateway, which transforms a call from the PSTN 4 into a VoIP call using H.323, SIP or MGCP or other signaling protocol. For example, the VoIP gateway is equipped with a T1/E1 interface to the PSTN 4 and a 100 Mb Ethernet interface to the IP network 108. The VoIP gateway uses "voice encoder and decoder" (vocodec), e.g. G.711, G.729, and G.723, to transport the voices of the caller/callee. The vocodec is a card specialized to transport human voice. In a similar fashion, the gateway uses T.38, a codec specialized to transport T.30 messages (i.e. the language used by fax machine to communicate). The gateway 104 may be Cisco Systems Inc. model 2600 series, 3600 series, MC 3810, 7200, 7750 and AS5300 (trade-mark). Those gateways use a VoIP card, a PSTN interface card and a network interface. The gateway 104 may be replaced with a T.38 aware terminal (e.g. T.38 fax machine) or another FoIP server 102 anywhere on the company's network or the Internet.

The gateway 104 establishes a T.30 session with the fax. Instead of making any decision regarding the session, the gateway 104 forwards everything to the FoIP server 102 and the FoIP server 102 terminates the T.30 session.

The FoIP server 102 is a VoIP end point for receiving and sending faxes. The FoIP server 102 mediates FoIP calls and a message transfer agent (MTA), e.g. messaging system 106. The FoIP server 102 uses standard signaling protocol such H.323, SIP (Session Initiation Protocol), MGCP (Media Gateway Control Protocol) to establish call. The FoIP server 102 is part of the VoIP network. The FoIP server 102 does not limits its signaling protocol to H.323, SIP and MGCP and may use other signaling protocol. The FoIP server 102 exchanges faxes with the gateway 104 using T.38. The FoIP server 102 provides the fax portion of the unified communication (e-mail, fax, voice).

Figure 3:
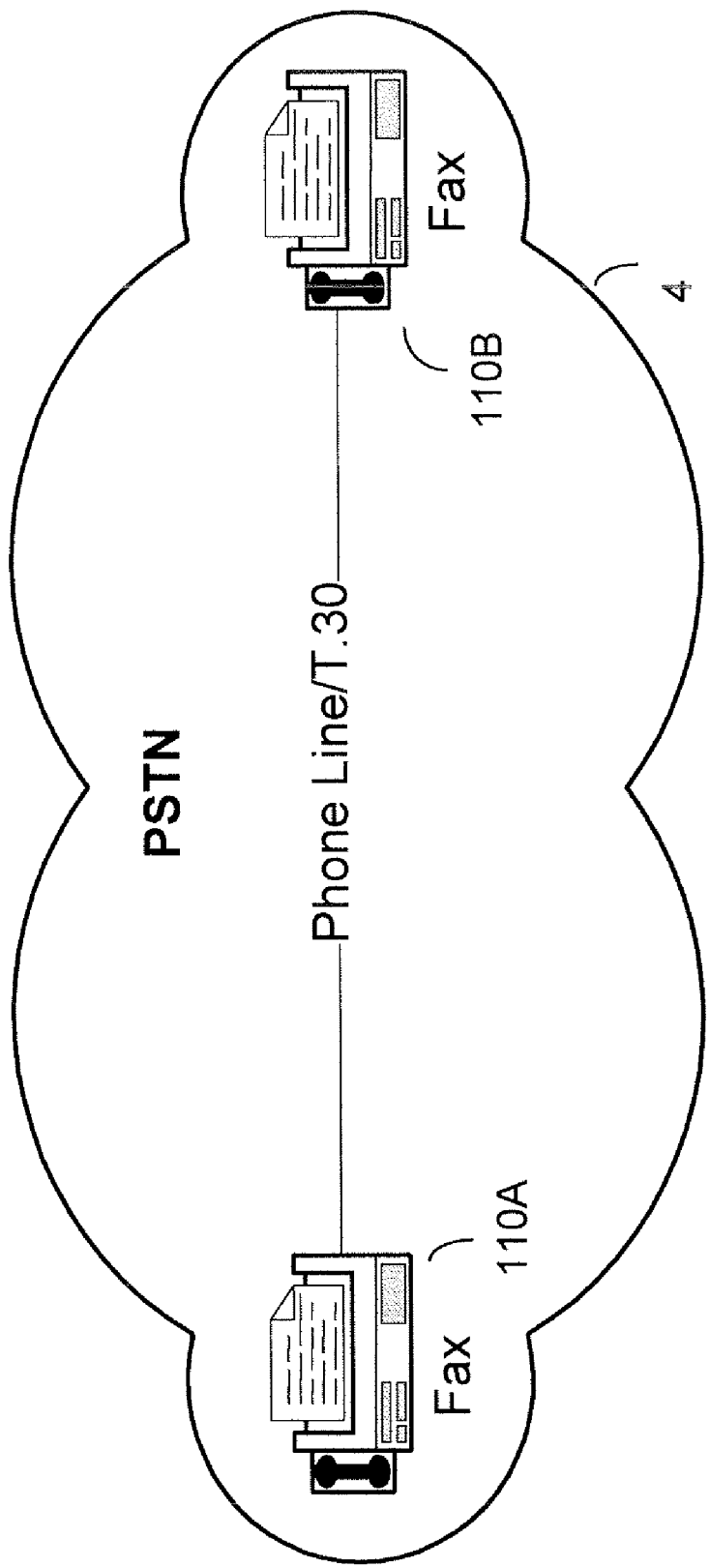
FIG. 3 is a schematic diagram showing T.30 fax machines on a PSTN.

Protocols used by the FoIP server 102 and the gateway 104 are now described in detail. T.30 is a standard protocol approved by the International Telecommunication Union (ITU) that defines how fax machines communicate together over analog lines. As illustrated in FIG. 3, fax machines 110A and 110B on the PSTN 4 communicate with each other using T.30 protocol.

H.323 is a standard protocol approved by the ITU that defines how audiovisual conferencing data is transmitted across networks. H.323 is commonly used for voice calls across networks, a subset of video conferencing. SIP is a standard IETF generic protocol to establish sessions and one of the most common application is to establish VoIP calls. MGCP is a protocol used to convert PSTN calls to calls carried over packet network.

T.38 is a standard protocol "Procedures for real-time Group 3 facsimile communication over IP networks" approved by the ITU that defines how T.30 messages can be transported over packet network. The scope of T.38 is to provide a means of communication for T.30 devices (i.e. fax machines) over packet network. The T.38 codec is specialized to transport fax machine language (i.e. T.30 messages exchanged between fax terminal). The T.38 specification does not provide any means to establish the communication between packet network endpoint. VoIP protocols, such as H.323, SIP and MGCP, are designed to be used for that purpose. T.38 mainly specifies the tunneling technologies to transfer the T.30 messages exchanged between fax machines over a packet network.

Figure 4:
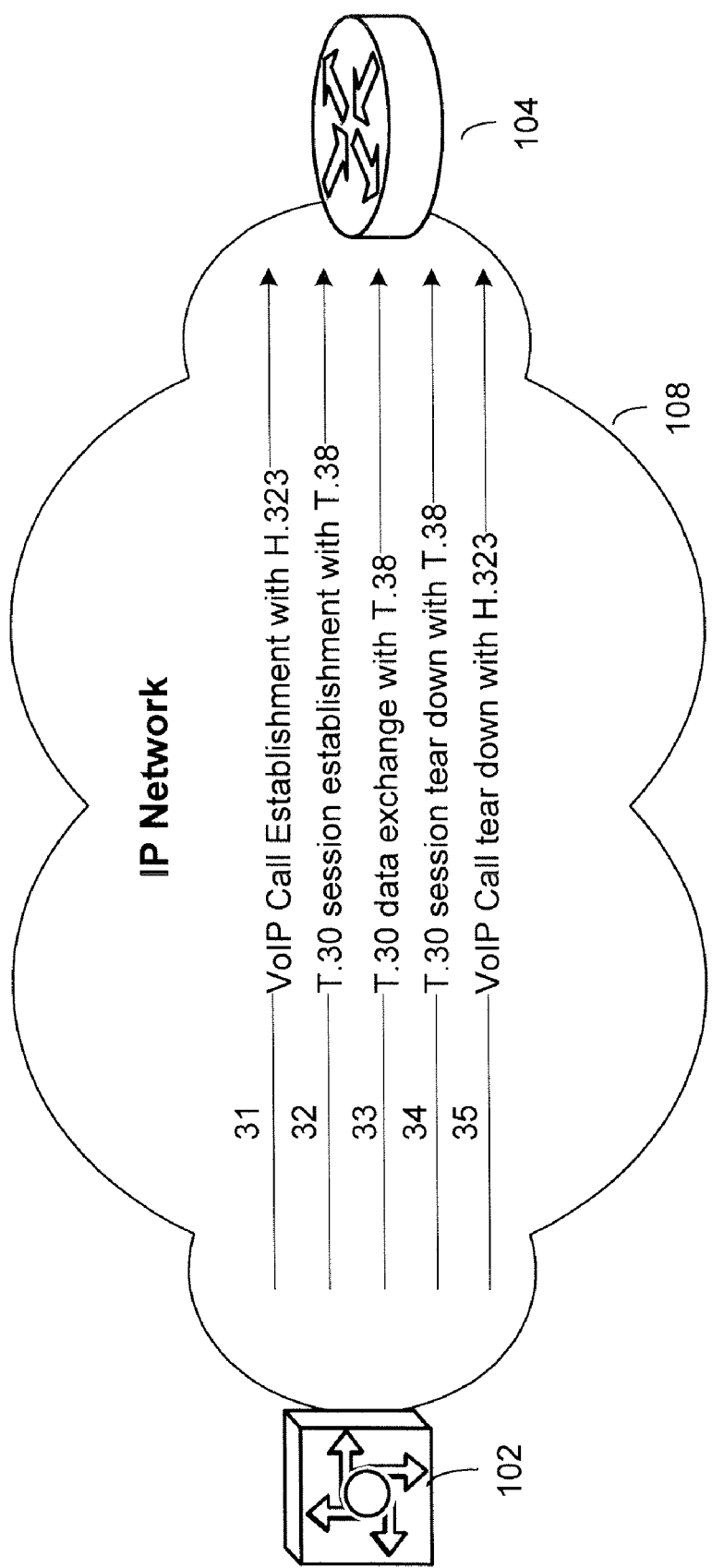
FIG. 4 is a schematic diagram showing one example of the process for establishing a call over a packet network in FIG. 2.

A fax transmission over the packet network between the FoIP server 102 and the gateway 104 may be illustrated as showed in FIG. 4. Referring to FIG. 4, in step 31, a VoIP call is established between the FoIP Server 102 and the gateway 104 using H.323, SIP or MGCP. In step 32, a T.30 (fax machine to fax machine) tunnel session is established using T.38. In step 33, a T.30 data exchange (fax transmission) occurs using T.38. In step 34, the T.30 session is torn down using T.38. In step 35, the VoIP call is torn down using H.323, SIP or MGCP.

Referring to FIG. 2, the FoIP server 102 and the gateway 104 establishes a call in a manner similar to that of FIG. 4.

Figure 13:
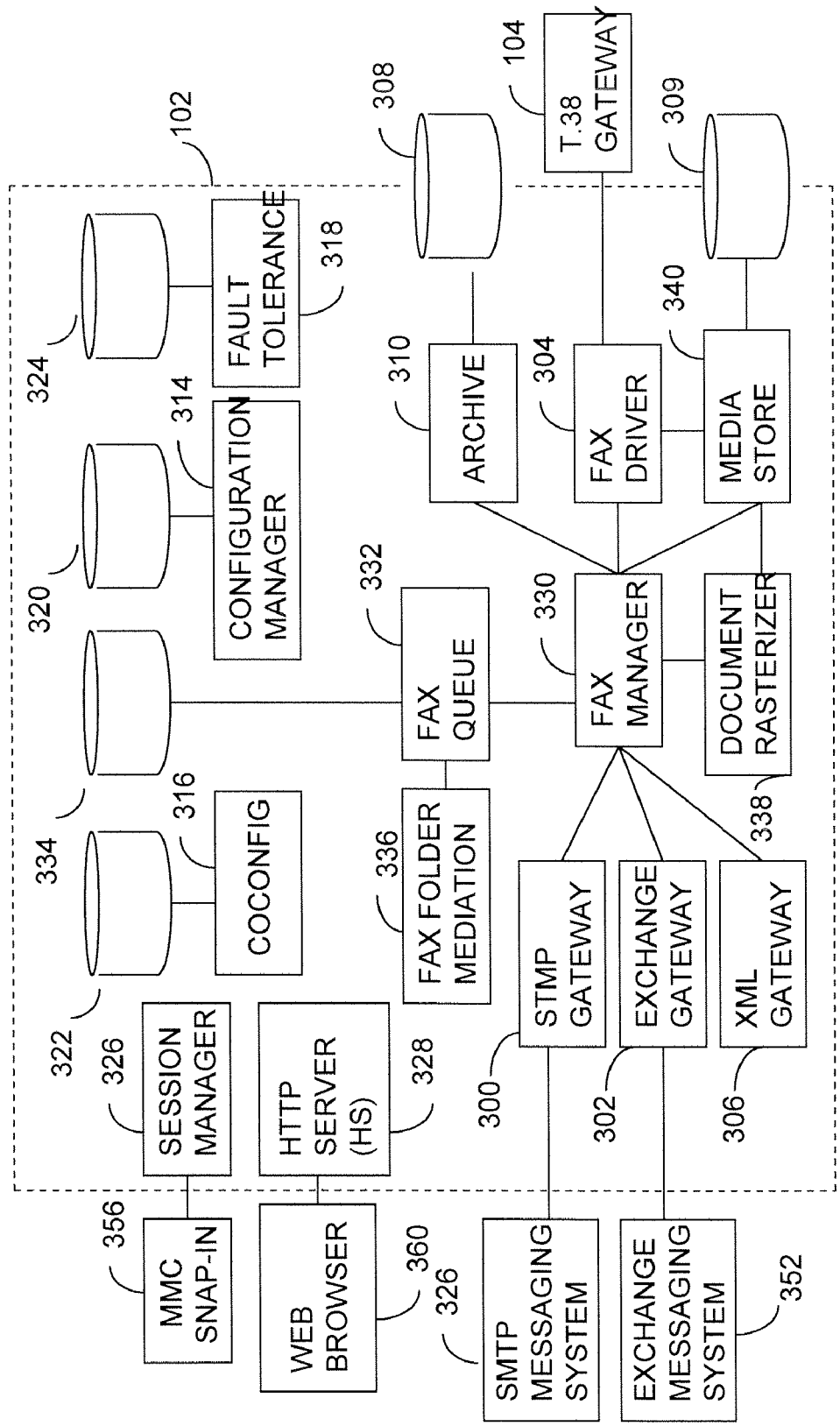
FIG. 13 is a schematic diagram showing one example of a FoIP server of FIGS. 2 and 9.

The FoIP server 102 has one or more main processors for processing standard signaling, e.g. T.38 and T.30. The FoIP server 102 has functionality to capture all available transaction information, e.g. caller identification (ID) number, caller ID name, caller number, gateway address, date and time, duration, transmission speed, number of pages, CSID (Call Subscriber ID) and DMTF (Dual Tone Multi-Frequency). The FoIP server 102 stores fax media information and transaction and provides remote access to the data through protocol, e.g. HTTP (Hyper Text Transport Protocol). The fax media information is stored into a media database 309 (FIG. 13).

The FoIP server 102 handles a plurality of simultaneous fax calls. For each one, a virtual T.30 engine created in the FoIP server 102 simulates a fax terminal. All outgoing faxes are queued until they are routed/delivered and they are archived for later retrieval.

The FoIP server 102 may be embodied as a computing device that operates in accordance with a series of instructions contained in a program element stored on a computer readable storage medium. The series of instructions indicate to the computing device how to react under various conditions, e.g., in the case of receipt of an incoming fax, transmission of an outgoing fax.

The messaging system 106 includes a server 112. The messaging system 106 has functionality for interfacing with end users (e.g. desktop personal computer 114) and allowing them to formulate and retrieve electronic messages (mails) in a user-friendly format. The server 112 may be Exchange (trade-mark) from Microsoft Corp., Lotus Domino (trade-mark) from International Business Machines Inc or an SMTP (Simple Mail Transfer Protocol) based server. The messaging system 106 may use Microsoft Outlook (trade-mark) or Lotus Notes (trade-mark) for distributing the mails. The messaging system 106 can be composed of several Messaging servers 112 that can be spread across multiple networks.

The communication system 100 may communicate with more than one gateway 104 and may include more than one FoIP server 102.

Figure 5:
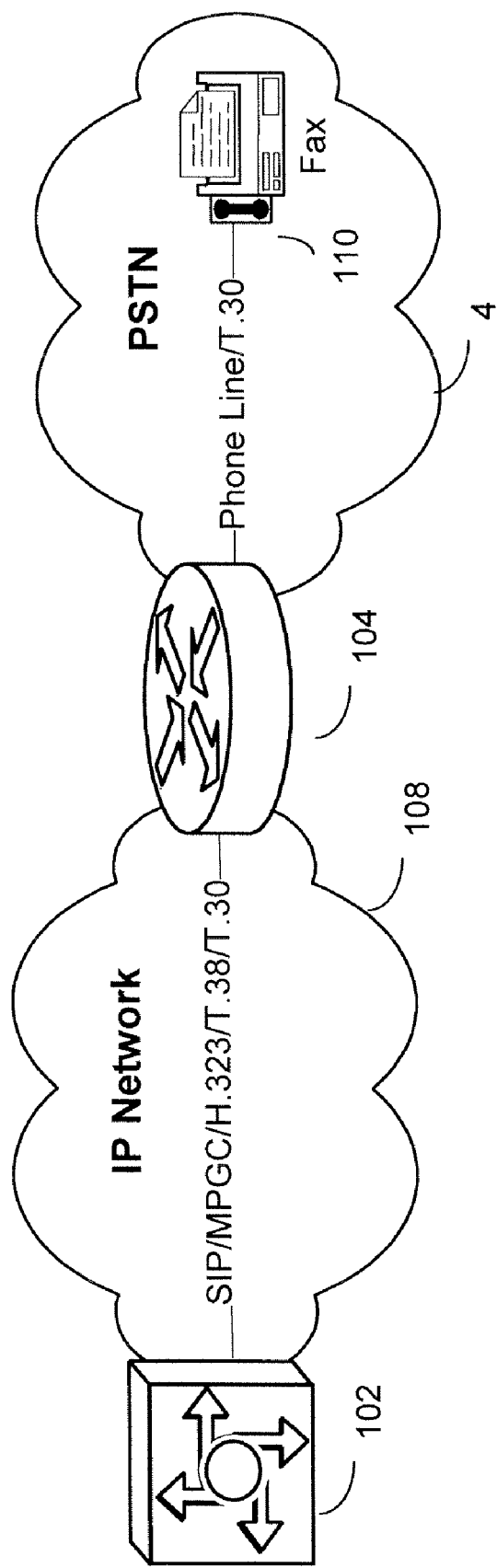
FIG. 5 is a schematic diagram showing an incoming fax data flow in the communication system of FIG. 2.
Figure 6:
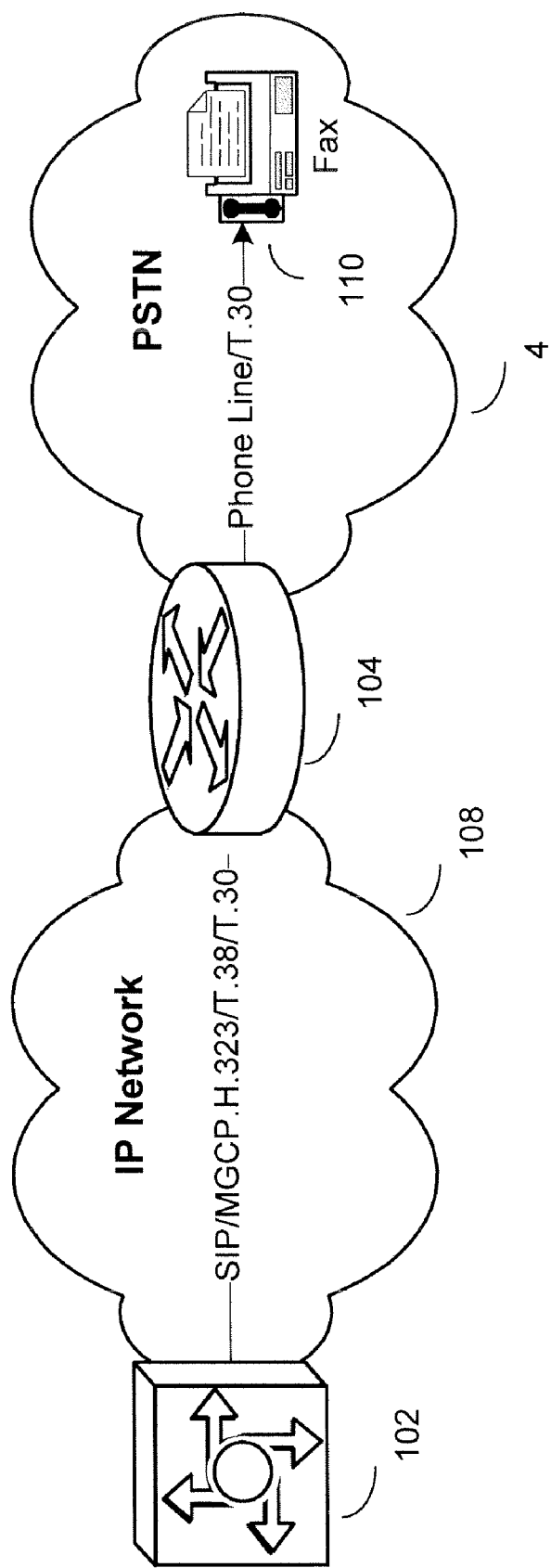
FIG. 6 is a schematic diagram showing an outgoing fax data flow in the communication system of FIG. 2.

The operation for establishing a call between the FoIP server 102 and the gateway 104 is now described. FIG. 5 shows an incoming fax scenario of the communication system 100 of FIG. 2. FIG. 6 shows an outgoing fax scenario in the communication system 100 of FIG. 2. The FoIP Server 102 and the gateway 104 may use gatekeeper (if using H.323) or Proxy/registrar (if using SIP) to determine which gateway/FoIP server is to be used for a given telephone number. For example, before establishing a VoIP call, the H.323 end point (gateway/FoIP server) may requests, to a gatekeeper (not shown), the IP address of the end point responsible to handle the call. In response to the request, the gatekeeper provides the IP address. Alternatively the FoIP server or the gateway may have a local dial plan to decide which endpoint handles which number.

Referring to FIG. 5, "an incoming fax scenario" using H.323, SIP or MGCP is now described. The gateway 104 receives a fax call on its PSTN interface for the number XXXX. Then, the gateway 104 may requests to a gatekeeper (only for H.323) the IP address of the device handling the number XXXX. Alternatively it may use its local dial plan to determine the IP address of the device handling the number XXXX. The gateway 104 establishes a call to the FoIP server with the specified IP address.

Referring to FIG. 6, "an outgoing fax scenario" using H.323/SIP/MGCP is now described. The FoIP server 102 has a fax that is sent to the number YYYY. The FoIP server 102 may requests, to a gatekeeper (only for H.323), the IP address of the device handling the number YYYY. Alternately the FoIP server may use its local dial plan to determine the IP addresses if the device handling the number YYYY. Then, the FoIP server 102 establishes a call with the gateway with the specified IP address.

Figure 7:
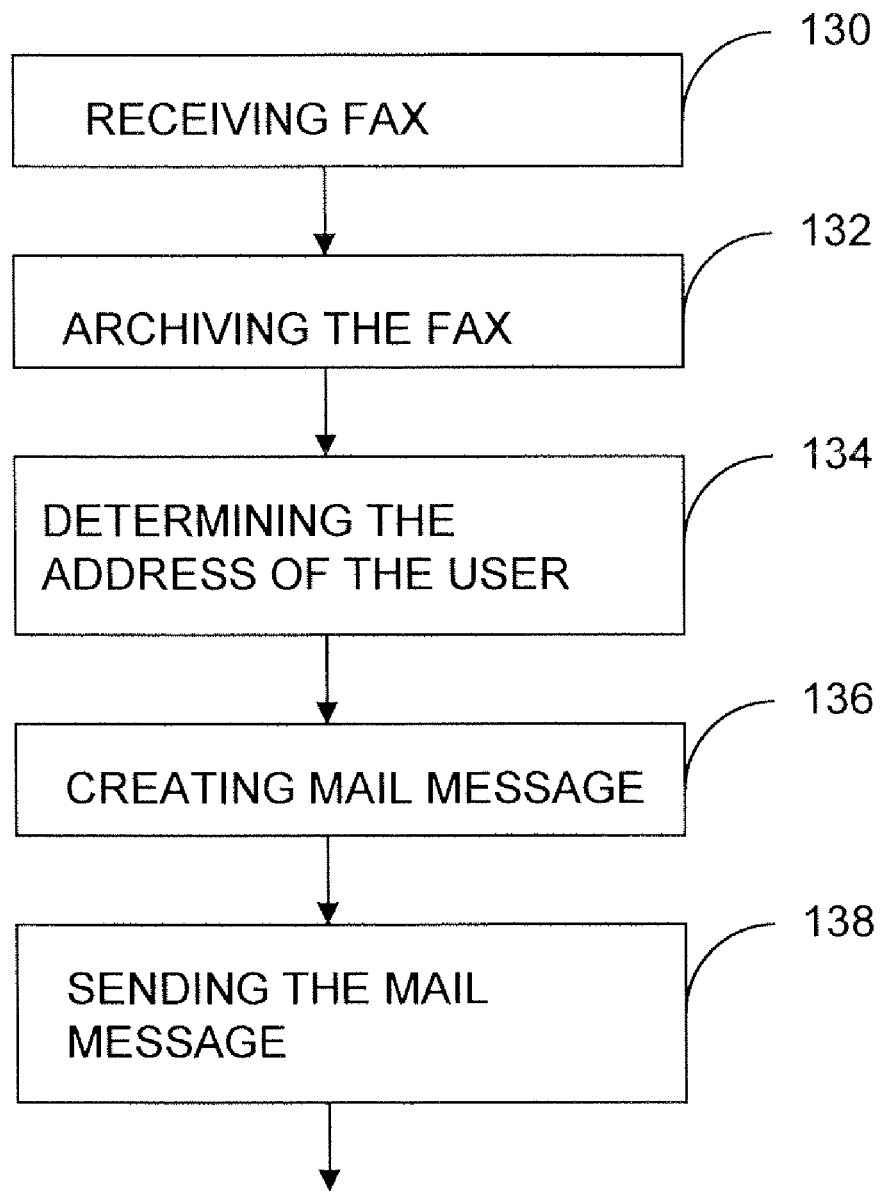
FIG. 7 is a flow diagram showing one example of the process for receiving an incoming fax from the PSTN 4 at the communication system of FIG. 2.

The process for receiving an incoming fax from the PSTN 4 at the communication system 100 of FIG. 2 is now described in detail. Initially, the gateway establishes a call with the FoIP server 102 which is to receive the fax in accordance with the "an incoming fax scenario (FIG. 5)". Referring to FIG. 7, in step 130, the FoIP server 102 receives IP packets corresponding to the fax from the gateway 104. In step 132, the FoIP server 102 archives the incoming fax. In step 134, the FoIP server 102 determines, based on the information collected during the call (e.g. called number, calling Number, CSID), the address of the user in the messaging system 106 that is to receive the fax. In step 136, the FoIP server 102 creates a mail message and, in step 138, the FoIP server 102 sends to the messaging system 106. The sender in the messaging system 106, e.g. Microsoft Outlook, Lotus Notes, distributes the mail message to the proper user mailbox. For example, the mail message from the FoIP server 102 to the user may contain the following information:

1. The sender indicates that the message comes from the FoIP system;
2. The subject is composed of information regarding the fax (Called Number, Calling Number, CSID, number pages);
3. The body contains the information about the transaction (time received, duration, number of page, an so on);
4. The mail contains one attachment that contains the receive fax in tiff format. That attachment can be viewed using Tiff viewer such Wang imaging; and
5. Optionally the e-mail may contain other information that can be used to display the transaction information using specialized forms and formats.

Figure 8:
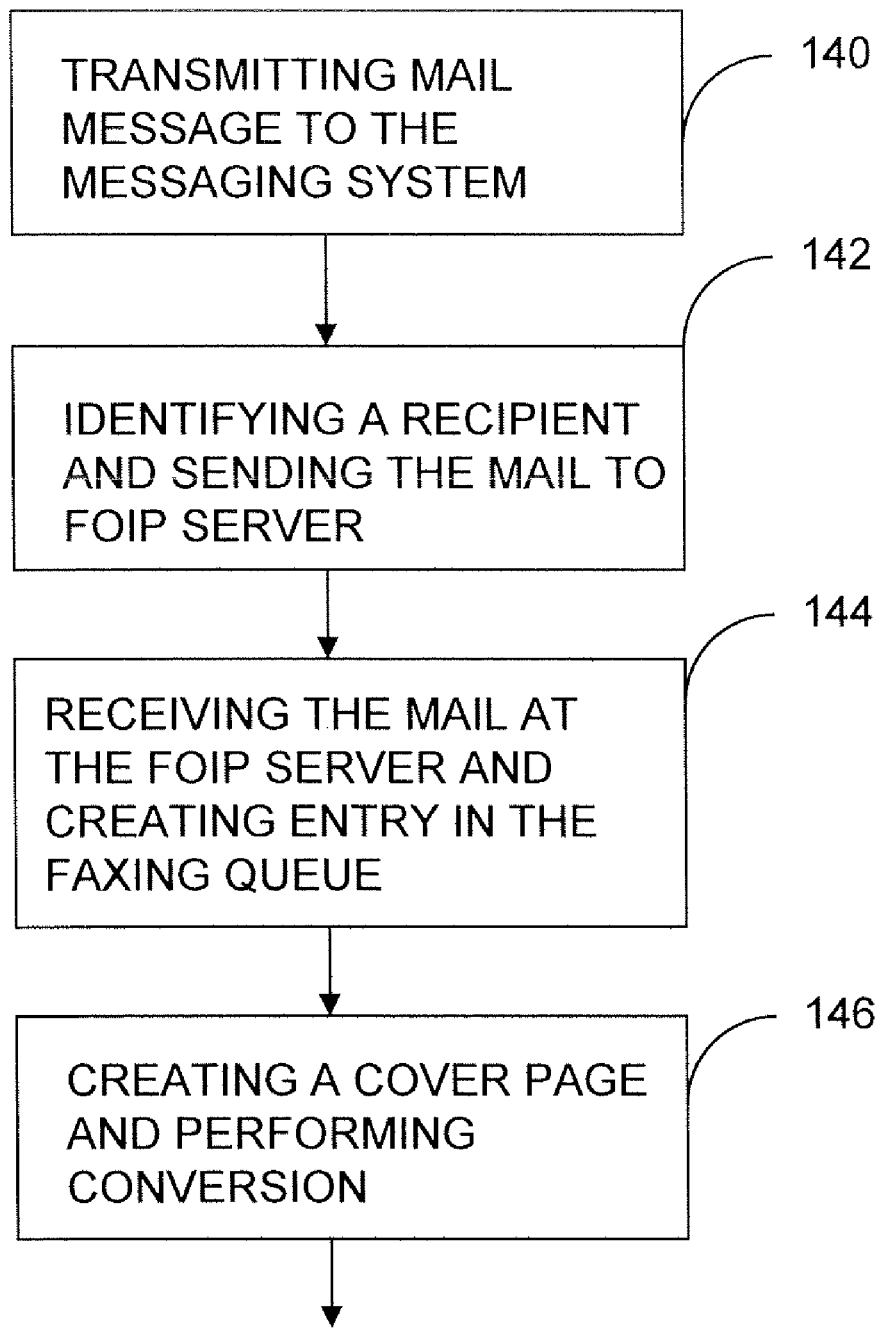
FIG. 8 is a flow diagram showing one example of the process for sending faxes from the communication system of FIG. 2 to the PSTN.

The process for sending faxes from the communication system 100 of FIG. 2 to the PSTN 4 is now described in detail. The end user uses its mail client, e.g. Microsoft Outlook or Lotus Notes, to create a mail message that will contain all the information to create a fax. For example, the mail message content may be interpreted the following way:

1. The recipients selected represents fax numbers instead of an e-mail address and they will be relayed to the FoIP Server;
2. The e-mail subject will become the fax subject;
3. The e-mail body will be inserted as comment on the fax cover page;
4. The attached documents will be converted to fax format and appended to the fax (after the coversheet);
5. Optionally special codes may be used to specify settings particular to a fax transmission; and
6. Optionally specialized forms may be used to specify settings particular to a fax transmission;

Referring to FIG. 8, in step 140, the mail message is transmitted from the mail client to the server 112 of the messaging system 106. In step 142, the messaging system 106 examines the recipient addresses to find that they contain fax numbers they will be transferred to the FoIP server. When they contain fax numbers, the messaging system 106 transfers each mail to the proper FoIP server. In step 144, when the FoIP server 102 receives the mail, the FoIP server 102 extracts all the information pertaining to the fax transmission and creates entry in the faxing queue corresponding to each fax. In step 146, the FoIP server 102 creates the cover page and converts the attachment documents into tiff format. Once that is completed, the fax transaction is ready to be sent to the first available VoIP gateway able to handle the transmission. The FoIP server 102 then follows the steps described in "An outgoing fax scenario (FIG. 6)" to send the fax over IP network. If the transaction is successful, the entry in the fax queue is marked as completed and will be archived. If the transaction is a failure, the FoIP server 102 marks the transaction as "Waiting for retry" and will be resent after a certain delay or "Failed" if no retry are programmed, in that case, the transaction will be archived.

In FIG. 2, the FoIP server 102 communicates with the messaging system 106. However, the FoIP server 102 and backend applications, e.g. CRM (Customer Relationship Management), document management, web services, mainframe, or a specialized application may communicate with an API specifically designed to fax enable the backend applications.

Figure 9:
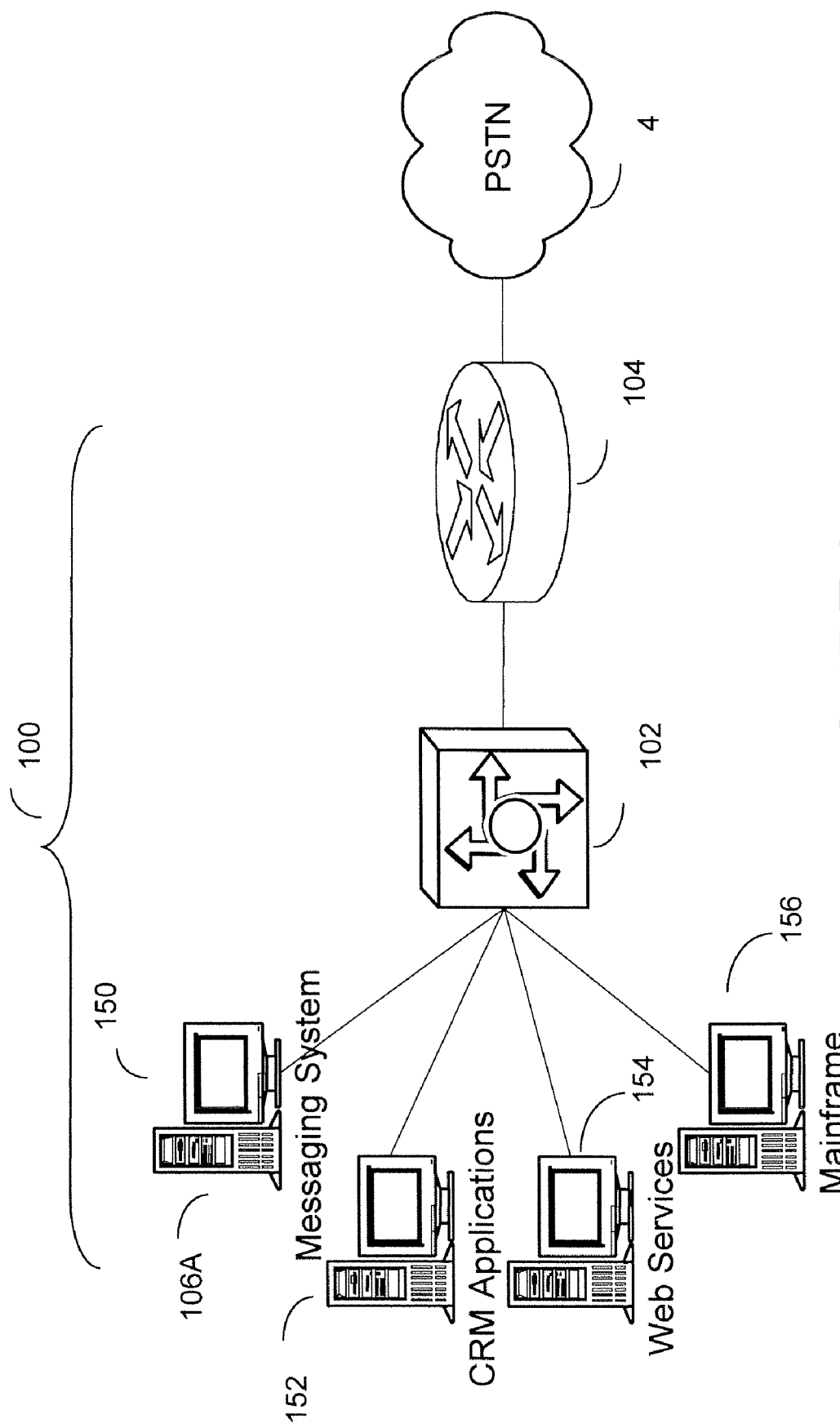
FIG. 9 is schematic diagram showing anther example of the communication network of FIG. 2.

FIG. 9 shows another example of the communication system 100 shown in FIG. 2. In the communication system 100 of FIG. 9, the FoIP server 102 communicates with enterprise backend systems 150, such as the messaging system 106A (e.g. Exchange, Notes, SMTP), CRM applications 152, Web services 154, a mainframe 156, a form processing application, document management or a specialized application. The FoIP server 102 accepts faxing request from the backend systems 150 and reports fax transaction to the backend systems 150. The FoIP server 102 mediates between the FoIP calls and the backend systems 150.

Incoming faxes are automatically routed to the messaging system 106A, other backend system or directly to the user. The FoIP server 102 in FIG. 9 has functionality of unifying messages.

Figure 10:
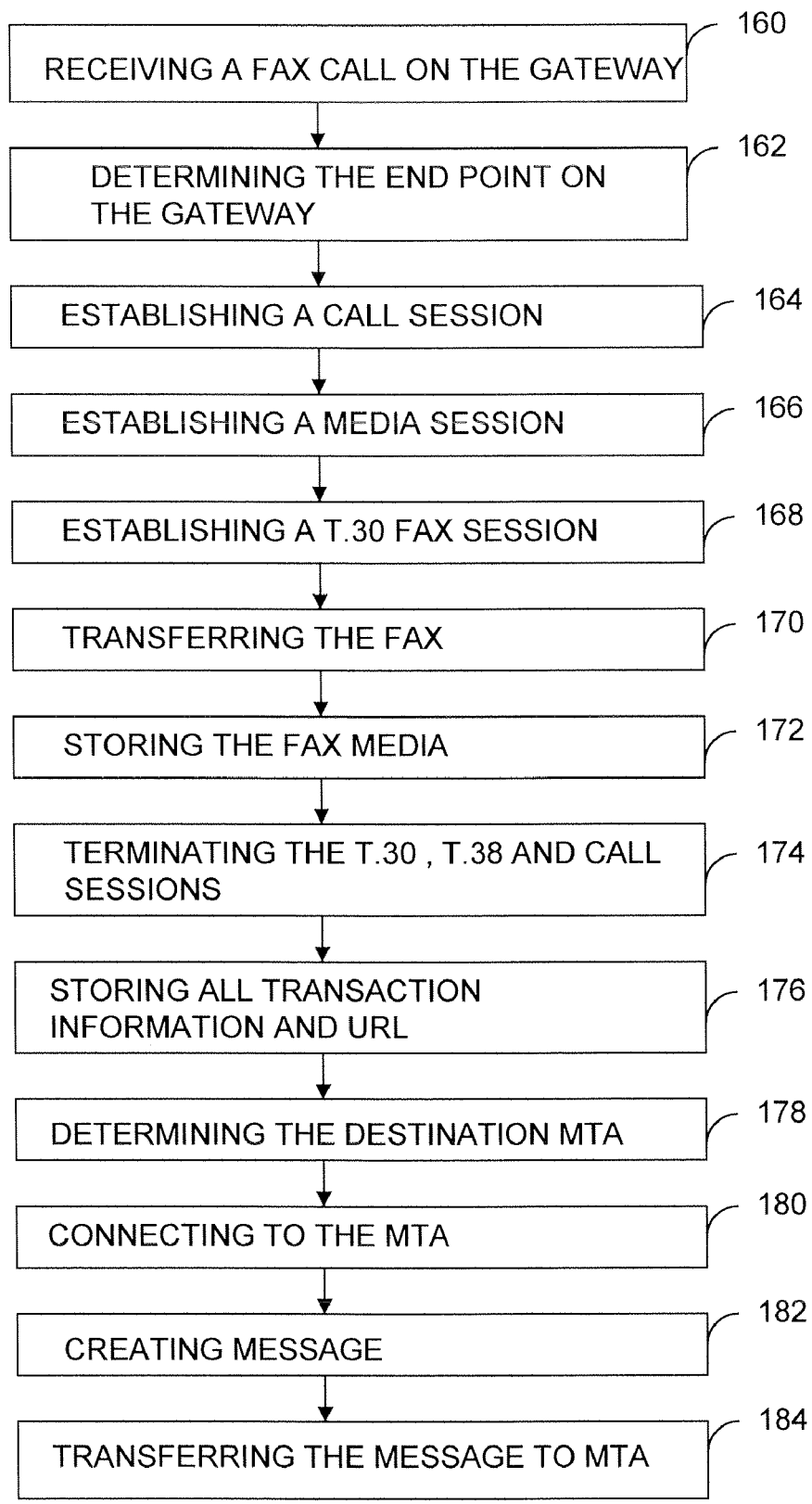
FIG. 10 is a flow diagram showing one example of the process for receiving an incoming fax from the PSTN at the communication system of FIG. 9.

The process for receiving an incoming fax from the PSTN 4 at the communication system 100 of FIG. 9 is now described in detail. Referring to FIG. 10, in step 160, the gateway 104 receives a fax call on the gateway telephony interface connected to the PSTN 4. In step 162, the gateway 104 determines the end point (FoIP server) on the packet network that will handles the fax call, based on the gateway dial plan or a dial plan obtain from a centralize service. The gatekeeper (not shown) acts as the "centralize service" when H.323 is used. The proxy/registrar infrastructure (not shown) acts as the "centralize service" when SIP is used. It is assumed that the FoIP server 102 is the end point.

In step 164, a call session between the gateway 104 and the selected FoIP server 102 is established using standard signaling protocols. If call establishment fails, the gateway 104 uses the dial plan to determine a new alternate FoIP server. In step 166, a media session between the gateway 104 and the selected FoIP 102 server is established using ITU T.38 protocol. If the media session establishment fails, the gateway 104 uses the dial plan to determine a new alternate FoIP server. In step 168, a T.30 fax session between the fax terminal on the PSTN 4 initiating the call and the FoIP server 102 is established. In step 170, the fax is transferred between the fax terminal on the PSTN 4 and the FoIP server 102 according to T.30 protocol.

In step 172, the FoIP server 102 stores the fax media into a media database (not shown) into one or many files. In step 174, the T.30 session, T.38 and call session are terminated. In step 176, the FoIP server 102 stores all transaction information and URL to the files containing the fax media.

In step 178, the FoIP server 102 determines, based on the transaction information, a destination address and a MTA for the incoming fax. In step 180, the FoIP server 102 is connected to the MTA to transfer the incoming fax message. In step 182, the FoIP server 102 creates a message in a format compatible with the selected MTA. The message contains the fax media file (in native tiff fax format or any other format through conversion), transaction information in machine readable (code embedded in the message), human readable text (embedded in the title and body of the message and human readable graphic (embedded into the media file attachment). In step 184, the FoIP server 102 transfers the created message to the MTA.

Figure 11:
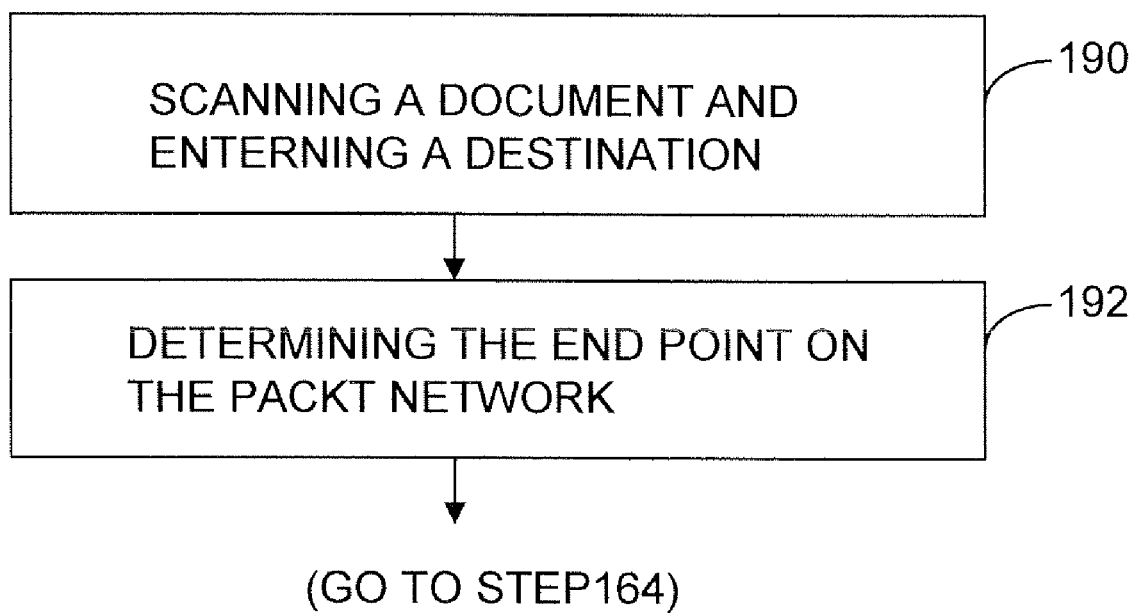
FIG. 11 is a flow diagram showing anther example of the process shown in FIG. 10.

When the gateway 104 is replaced with a T.38 aware terminal (e.g.T.38 fax terminal) (not shown), steps 160 and 162 are replaced with steps 190 and 192 as shown in FIG. 11. Referring to FIG. 11, in step 190, the T.38 aware terminal scans a document and a destination is entered from a terminal input interface, such as a keyboard or touch screen. In step 192, the end point on the packet network that will handle the fax call is determined based on the terminal dial plan or a dial plan obtained from a centralize service and the information entered by the user.

Figure 12:
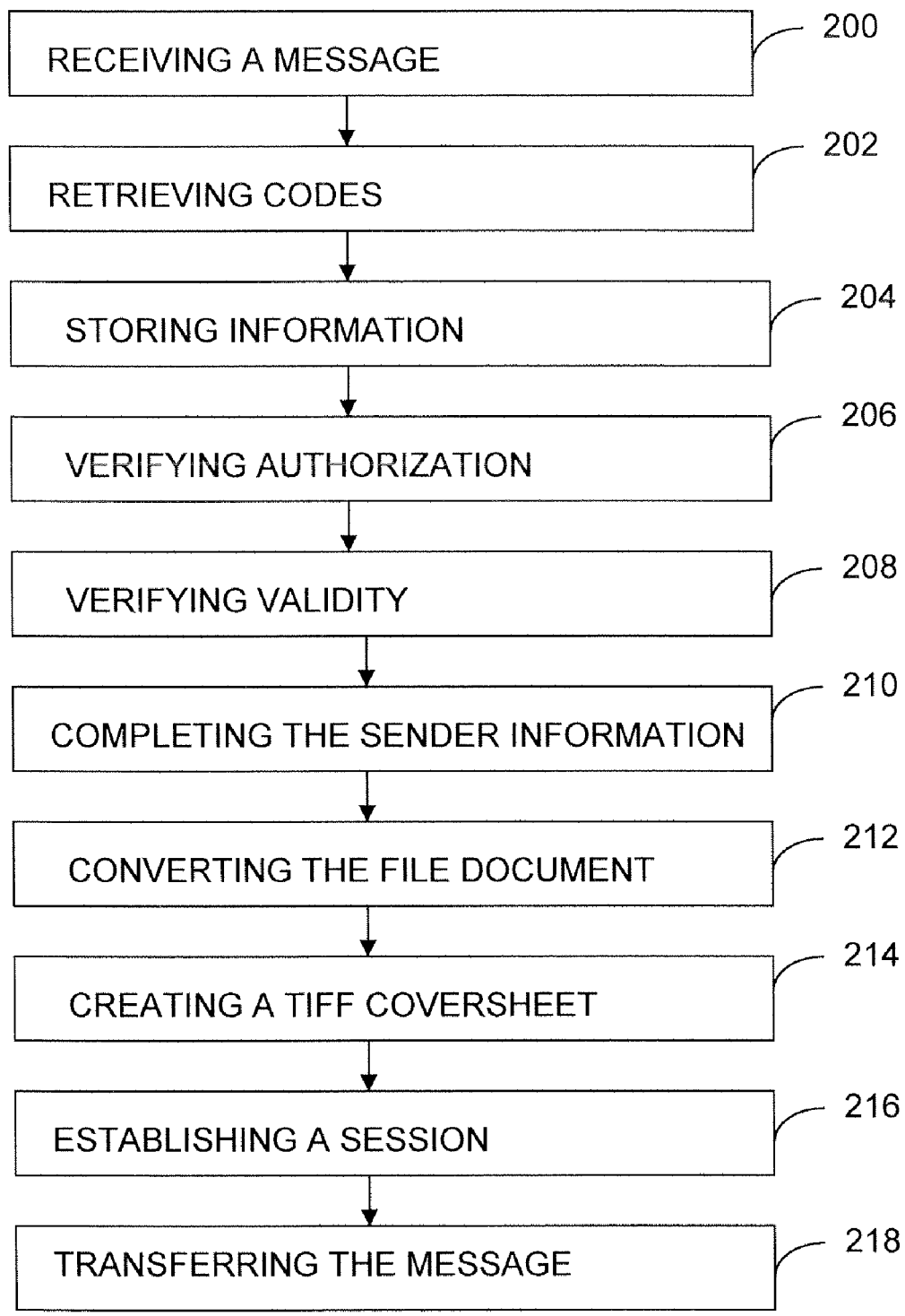
FIG. 12 is a flow diagram showing one example of the process for sending an outgoing fax from the communication system of FIG. 9 to the PSTN.

The process for sending an outgoing fax to the PSTN 4 from the communication system 100 of FIG. 9 is now described in detail. Referring to FIG. 12, in step 200, the FoIP server 102 receives a message containing embedded codes describing the faxing options, sender information and the list of fax recipients, and a list of file documents attached to the message. In step 202, the FoIP server 102 retrieves all embedded and files attached codes from the message. In step 204, the FoIP server 102 stores sender, fax options, recipients and documents to fax into the FoIP database (e.g. media database).

In step 206, the FoIP server 102 verifies if the sender is authorized to send faxes either from an external directory or from the FoIP server internal directory. If the sender is not authorized to fax, the transaction is refused and the sender is notified.

In step 208, the FoIP server 102 verifies that recipient destinations are valid. If a recipient destination is not valid the transaction for that destination is refused and the sender is notified. In step 210, the FoIP server 102 completes the sender information by retrieving extra information from a centralized directory external to the communication system 100. In step 212, the FoIP server 102 converts the file documents from their native format to tiff format by using the native application. A printer driver, command line converters, internal conversion engine or specialized conversion API may be used in conjunction with the application.

In step 214, the FoIP server 102 creates a tiff coversheet for each recipient using sender and the recipient information. In step 216, the session between the FoIP server 102 and the gateway is established. In step 218, the tiff format information is sent to the gateway.

FIG. 13 shows one example of the FoIP server 102 shown in FIGS. 2 and 9. The FoIP server 102 of FIG. 13 includes a SMTP gateway 300 and an Exchange gateway 302, which provide interfaces to external messaging systems, i.e. SMTP messaging system 326 and Exchange messaging system 352. The external messaging systems may be remotely accessed through the network. The SMTP gateway 300 and the Exchange gateway 302 allow the end-user to send faxes on the PSTN and receive fax transaction mail notifications.

As an example, the FoIP server 102 is composed of the components describe hereafter and in FIG. 13. It includes a fax driver 304 and a XML gateway 306. The fax driver 304 communicates with the T.38 gateway 104 to send/receive faxes to/from the PSTN (4). The XML gateway 306 processes XML outbound fax documents. For example, those XML documents may be transferred to the FoIP Server 102, in a file system directory that is scanned by a backend application the FoIP server 102 or through http.

A fax archive database 308 is provided to the FoIP server 102. The fax archive database 308 may be located in the FoIP or on the IP network and accessed remotely. For example, it can be accessed through JDBC (Java DataBase Connectivity). The fax archive database 308 is used to store all the completed fax transaction details. For archiving fax information, an archive component 310 is provided.

The fax media from the PSTN (4) is stored in a media store database 309. The media store database 309 may be installed locally on the FoIP file system or on the IP network on remote file system. The media store database 309 contains all the documents used to generate the outgoing faxes (e.g. Microsoft Word (trade-mark), Microsoft Excel (trade-mark), text, coversheet, etc.), the outgoing fax tiff and incoming fax tiffs.

The FoIP server 102 further includes a configuration manager 314, CoConfig 316 and a fault tolerance 318 which are components for providing internal functionality to other system component. The configuration manager 314 and CoConfig 316 contain respectively the system configurations and company configurations. The fault tolerance 318 monitors all components and possible faults, manages the fail over mechanisms and component election process. The configuration manager 314, the CoConfig 316 and the fault tolerance 318 communicate with a configuration database 320, a CoConfig database 322 and a services state database 324, respectively for obtaining relevant information.

The FoIP server 102 further includes a session manager 326 and a http server 328. The session manager 326 grants/denies system access to remote administrative tools like an MMC Snap-in (trade-mark of Microsoft) 356 and/or API. The http server 328 is used to relay web access requests from web browser 360 or backend applications to the FoIP components.

The FoIP server 102 further includes a fax manager 330, a fax queue 332, a fax queue database 334, a fax folder mediation 336, a document rasterizer 338 and a media store 340. The fax manager 330 contains all the intelligence to handle the faxes. The fax queue 332 controls access to the fax queue database 334. The fax folder mediation 336 serves remote client access to the fax lists. The media store 340 read, based on the instructions of the fax manager 330, the fax media from the media storage database 309 and stores them. The document rasterizer 338 converts documents in the media store 340 into faxes.

According to the embodiment of the present invention, the fax server, i.e., FoIP server, communicates with T.38 fax machine without going through the PSTN. Thus, specialized circuit fax cards for interfacing with the PSTN to deliver fax transmissions are no longer required. Moreover, through with a gateway connected to the PSTN, the same Telco T1/E1/analog interfaces is shared to deliver voice service and fax services, enabling a more efficient use of the available bandwidth on the lines, this again without any specialized circuit fax cards. For example, voice services can be IP PBX (Interactive Voice Response), IP IVR (Interactive Voice Response) and IP UM (unified messaging). Also the FoIP server can reuse infrastructure (gateway 104) and messaging system 106A already deployed to deliver voice services and vice versa.

According to the embodiment of the present invention, the FoIP server used in conjunction with the VoIP system offers a single user experience for e-mail, voice mail and fax, by making all those messages available in the user mailbox.

While particular embodiments of the present invention have been shown and described, changes and modifications may be made to such embodiments without departing from the true scope of the invention.

What is claimed is:

1. A communication system for delivering fax messages, comprising:
    an enterprise backend system including a first server and a message transfer agent (MTA) transferring and receiving messages;
    a packet network;
    a gateway connecting a Public Switched Telephone Network (PSTN) and the packet network; and
    a second server establishing communication with the gateway through the packet network, and transacting a fax message between the MTA and a fax terminal connected to the PSTN.

2. The communication system as claimed in claim 1, wherein the second server establishes communication with the gateway over the packet network using a standard signaling protocol, and exchanges data in the fax message using ITU T.38protocol.

3. The communication system as claimed in claim 1, further comprising a gatekeeper for providing an address of the second server to the gateway when the gateway establish a connection to the second server, and for providing an address of the gateway to the second server when the second server establishes a connection to the gateway.

4. The communication system as claimed in claim 1, wherein the second server captures transaction information for transmitting the fax message.

5. The communication system as claimed in claim 4, wherein the transaction information includes at least one of caller ID Number, caller ID Name, called number, gateway address, date, time, duration, transmission speed, number of pages, Call Subscriber ID (CSID) and Dual Tone Multi-Frequency (DMTF).

6. The communication system as claimed in claim 1, wherein the second server stores fax media information and transaction information.

7. The communication system as claimed in claim 1, wherein the second server provides remote access to the data.

8. The communication system as claimed in claim 1, wherein the second server accepts faxing request from the MTA or reports fax transactions to the MTA.

9. The communication system as claimed in claim 1, wherein the MTA is replaced by a backend application; the second server mediating between a real time fax over IP (FoIP) call and the backend application, the backend application being selected from a group consisting of a Customer Relationship Management (CRM) application, Web services, a mainframe, a form processing application, document management, a specialized application and a combination thereof.

10. The communication system as claimed in claim 1, wherein the fax message is transmitted using the ITU T.30 protocol.

11. A communication system for delivering fax messages comprising:
    an enterprise backend system including a first server and a plurality of message transfer agents (MTA) for transferring and receiving messages;
    a gateway connecting Public Switched Telephone Network (PSTN), the PSTN having a first fax terminal; and
    a second server communicating with the gateway through a packet network, the second server communicating with the plurality of MTAs,
    wherein the second server simulates a second fax terminal to the gateway, establishes communication with the gateway over the packet network using a standard signaling protocol, and exchanges fax data using ITU T.38 protocol, terminates a fax call originating from the first fax terminal, stores fax data into a media database, determines a destination address of a member of the plurality of MTAs, connects to the member of the plurality of MTAs, and creates a fax message for transfer in a format compatible with the member of the plurality of MTAs.

12. The communication system as claimed in claim 11, wherein the second server includes a processor processing standard signaling protocols.

13. The communication system as claimed in claim 11, further comprising a gatekeeper for providing an address of the second server to the gateway for establishing a connection to the second server, and for providing an address of the gateway to the second server when the second server establishes a connection to the gateway.

14. The communication system as claimed in claim 11, wherein the second server captures transaction information for transmitting the fax message.

15. The communication system as claimed in claim 11, wherein the transaction information further includes at least one of caller ID Number, caller ID Name, called number, gateway address, date, time, duration, transmission speed, number of pages, Call Subscriber ID (CSID) and Dual Tone Multi-Frequency (DMTF).

16. The communication system as claimed in claim 11, wherein the MTA is replaced by a backend application; the second server mediating between a real time fax over IP (FoIP) call and the backend application, the backend application being selected from a group consisting of a Customer Relationship Management (CRM) application, Web services, a mainframe, a form processing application, document management, a specialized application and a combination thereof.

17. A method of delivering a fax message in a communication network, the communication network including a message transfer agent (MTA) in an enterprise backend system including a first server for transferring and receiving messages, a gateway connecting Public Switched Telephone Network (PSTN) the PSTN having a first fax terminal; and a second server communicating with the gateway through a packet network and communicating with the MTA, the method comprising the steps of:
selecting a second server handling a first fax arrived on the first fax terminal;
simulating the second server as a second fax terminal to the gateway to transact fax message between the MTA and the first fax terminal;
establishing a first session between the gateway and the second server simulating the second fax terminal over the packet network using a standard signaling protocol, and exchanging fax data using ITU T.38 protocol, and a second session between the first fax terminal sending the fax on the PSTN and the second server;
transferring the first fax from the first fax terminal to the second server simulating the second fax terminal;
storing information related to the first fax in a media database;
determining, in the second server, a destination address of an MTA for the first fax on the second server;
connecting the second server to the MTA to transfer the first fax message;
creating, in the second server, a first message in a format compatible with the MTA based on the stored information;
connecting the second server to the MTA to transfer the first message; and
transferring the first message to the MTA.

18. The method as claimed in claim 17, wherein the establishing step further includes the steps of establishing a call session between the gateway and the second server using a standard protocol, establishing a media session between the gateway and the second server, and establishing a ITU T.30 fax session between the fax terminal and the second server.

19. The method as claimed in claim 17, wherein the establishing step further includes the step of determining a new alternate server based on a dial plan obtained from a centralize service when the call establishment fails.

20. The method as claimed in claim 17, wherein the storing step further includes the steps of storing a media of the fax in a file in the media database, and storing transaction information and URL to the file.

21. The method as claimed in claim 17, wherein the gateway is an ITU T. 38 aware terminal, and wherein the selecting step further includes the steps of: scanning a document; entering a destination from a terminal input interface; and selecting the second server on the packet network based on a terminal dial plan or a dial plan from a centralize service, and the information entered by the user.

22. The method as claimed in claim 17, wherein the MTA is replaced by a backend application; the second server mediating between a real time fax over IP (FoIP) call and the backend application, the backend application being selected from a group comprising a Customer Relationship Management (CRM) application, Web services, a mainframe, a form processing application, document management, a specialized application and a combination thereof.

23. A non-transitory storage medium readable by a computer encoding a computer program for execution by the computer to carry out a method of delivering a fax message in a communication network, the communication network including a message transfer agent (MTA) for transferring and receiving messages, a gateway connecting Public Switched Telephone Network (PSTN) the PSTN having a first fax terminal; and a second server communicating with the gateway through a packet network and communicating with the MTA, the computer program comprising:
code means for selecting a second server handling a first fax arrived on the first fax terminal;
code means for simulating the second server as a second fax terminal to the gateway to transact fax message between the MTA and the first fax terminal;
code means for establishing a first session between the gateway and the second server simulating the second fax terminal over the packet network using a standard signaling protocol, and exchanging fax data using ITU T.38 protocol, and a second session between the first fax terminal sending the fax on the PSTN and the second server;
code means for transferring the first fax from the first fax terminal to the second server simulating the second fax terminal;
code means for storing information related to the first fax in a media database;
code means for determining, in the second server, a destination address of an MTA in an enterprise backend system for the first fax on the second server;
code means for connecting the second server to the MTA to transfer the first fax message;
code means for creating, in the second server, a first message in a format compatible with the MTA based on the stored information;
code means for connecting the second server to the MTA to transfer the first message; and
code means for transferring the first message to the MTA.

* * * * *